United States Patent

[11] 3,561,345

| [72] | Inventors | John L. Kline<br>Louisville, Ky.;<br>Curtis W. Utz, New Albany, Ind. |
|------|-----------|------|
| [21] | Appl. No. | 804,149 |
| [22] | Filed | Mar. 4, 1969 |
| [45] | Patented | Feb. 9, 1971 |
| [73] | Assignee | American Air Filter Company, Inc.<br>Louisville, Ky.<br>a corporation of Delaware |

[54] DAMPER ARRANGEMENT
8 Claims, 3 Drawing Figs.

[52] U.S. Cl. .................................................. 98/38, 251/83
[51] Int. Cl. ..................................................... F24f 7/06
[50] Field of Search ........................................ 251/82, 83; 98/38 (B1), 38B, 38, 39

[56] References Cited
UNITED STATES PATENTS

| 1,263,830 | 4/1918 | Wolf................................ | 98/119 |
| 2,142,665 | 1/1939 | Brett et al. ...................... | 236/13 |
| 2,749,833 | 6/1956 | Hekelaar......................... | 98/37X |
| 3,059,565 | 10/1962 | Mears et al. ................... | 98/119 |
| 3,095,799 | 7/1963 | Pratt............................... | 98/119X |

Primary Examiner—William E. Wayner
Attorney—Ralph B. Brick

ABSTRACT: A damper arrangement including a fluid flow control damper connected to a damper operator by resilient connecting means so the damper is moved in response to movement of the operator and is moved independently of the operator by forces exerted directly upon the damper.

PATENTED FEB 9 1971

3,561,345

INVENTOR.
JOHN L. KLINE
CURTIS W. UTZ
BY
Edward M. Steuterman
ATTORNEY

DAMPER ARRANGEMENT

BACKGROUND OF THE INVENTION

Adjustable fluid flow dampers are provided in certain applications to modulate flow of fluid through the selected passageways Among other applications, such damper arrangements are provided in unit ventilators which condition air to be supplied to a selected space. In unit ventilators a stream of air is withdrawn from the space served by the unit ventilator, mixed with a stream of fresh air from an outside source, and the combined stream is selectively tempered before emission to the served space. The flow rate of both the recirculated air stream and the fresh air stream admitted to the device can be controlled by damper means disposed in the respective air flow conduits and it is desirable to maintain control of the flow of outdoor air and recirculated air to the unit because the temperature of the combined air stream emitted to the space served by the unit is maintained within a selected temperature range. In many previous devices the flow of outdoor air flow is undesirably increased by gusts of wind impinging on the outdoor air inlet and the temperature of the air stream emitted from the unit to the served space is adversely affected.

The present invention advantageously provides a damper to be used in a fluid flow passageway to modulate flow of fluid through the passageway and to automatically reduce the flow of fluid through the conduit in response to increased fluid velocity.

Moreover, the present invention further provides an advantageous arrangement which can be adapted to selectively modulate the flow of outdoor air and room air to a unit ventilator.

Various other features of the present invention will become obvious to those skilled in the art upon reading the disclosure set forth hereinafter.

More particularly, the present invention provides a damper arrangement comprising: fluid flow damper means; pivotable damper operator means actuated by a change in selected condition; resilient connecting means connecting the damper operator means and the damper means so the damper is pivoted in response to the movement of the operator means and is pivoted independently of the damper operator means by a force selectively exerted on the damper.

It is to be understood that the example of the present invention given hereinafter is not by way of limitation and that various changes can be made in the arrangement, form, or configuration of the apparatus disclosed without departing from the scope or spirit of the present invention.

Referring now to the FIGS. which show two examples of apparatus in accordance with the present invention:

Figure 2:
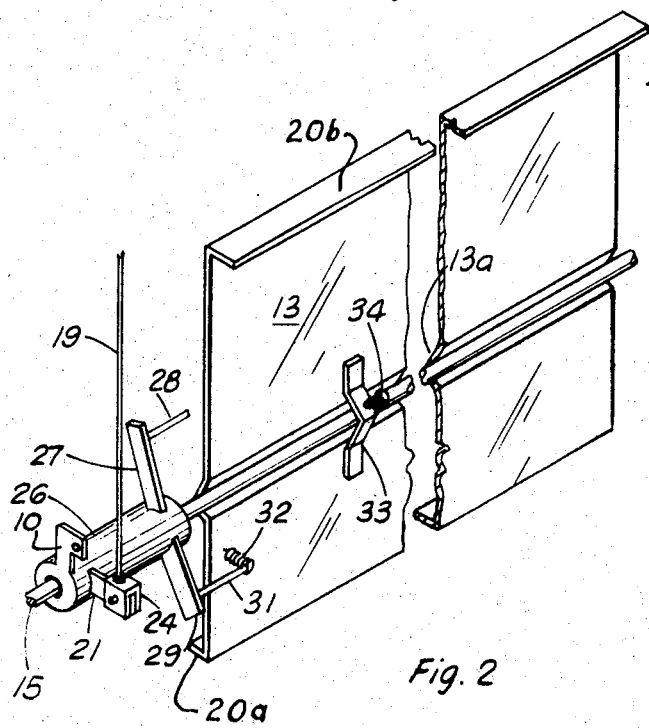
FIG. 2 is a perspective view, partly in section, of one damper arrangement in accordance with the present invention.

The example of a damper arrangement shown in FIG. 2 can be adapted to be pivotably disposed in a a fluid flow conduit and includes a damper blade 13 having a groove member 13a adapted to receive a damper operator shaft 15 for movement of the damper blade. Cooperative brackets 33 are provided adjacent groove 13 as shown to receive damper operator shaft 15 and fasteners 34 are provided to secure the damper blade to damper shaft 15.

Damper blade 13 can also include transversely extending edge flanges 20a and 20b as shown which extend outwardly from the damper blade in opposite directions. Furthermore, it will be noted that groove 13a of the example of the damper in FIG. 2 is not along the center axis of the blade but is advantageously located offcenter closer to flange 20a than to flange 20b.

In the example of the damper arrangement shown in FIG. 2, a cooperative sleeve 26 having an internal diameter greater than the outer diameter of shaft 15 is provided to turn freely on shaft 15 and includes an arm 21 adapted to receive a yoke 24 connected to an actuator arm 19. Arm 19 is operated by a selected damper operator, for example an operator 12 shown in FIG. 1 as hereinbefore described.

Sleeve 26 also includes radially extending brackets 27 and 29 with each bracket carrying laterally an extending arm 28, 31 respectively, as shown in FIG. 2. In accordance with one feature of the present invention a spring 32 is provided to connect damper 13 with arm 31 so damper 13 can move on damper shaft 15 independently of sleeve 26 within limits determined by the characteristics of spring 32. Advantageously, bracket 27 is disposed on sleeve 26 so arm 28 contacts damper 13 when sleeve 26 is rotated to a selected position for example to hold damper 13 in a closed position. Sleeve 26 can also carry a bracket 10 to be attached to a selected arm means, for example arm 16 of the apparatus shown in FIG. 1 and hereinafter described.

Figure 3:
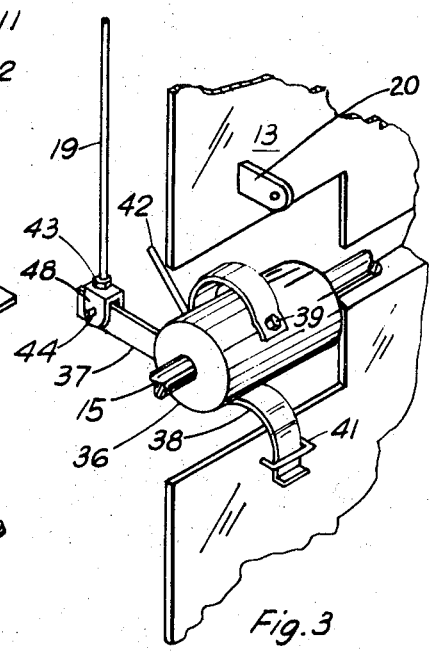
FIG. 3 is a segment of a perspective view of another example of a damper arrangement in accordance with the present invention.

FIG. 3 illustrates another example of an arrangement in accordance with the present invention, which includes a damper 13 having a slot at one edge, as shown, adapted to receive a sleeve 36 mounted on damper shaft 15 as in the example of FIG. 2. A bracket 37 extends radially outwardly from sleeve 36 to receive a yoke 48 which can be fastened to arm 37 by means of a pin 44. One end of actuator arm 19 is connected to yoke 48 by means of a fastener 43 and, as in the case of the example of FIG. 2, arm 19 is connected to a damper operator, hereinafter described, to move sleeve 36 in response to change in selected condition. In the example shown in FIG. 3, a resilient connecting means, for example a coil spring 38 having one end connected to sleeve 36 by means of a pin 39 and the other end adapted to be received by bracket 41 of damper 13 so spring 38 connects sleeve 36 and damper 41. Thus, damper 13 is moved in response to movement of sleeve 36 but can be moved independently of sleeve 36, within limitations imposed by spring 38, by a force opposing spring 38.

A stop 42 is fastened to sleeve 36 to selectively engage damper 13 to securely hold damper 13 in closed position as hereinafter described. One end (not shown) of stop 42 can be threaded and a multiplicity of spaced, threaded, apertures (not shown) can be provided in sleeve 36 so the position of stop 42 on sleeve 36 can be selected to provide desired operation.

Figure 1:
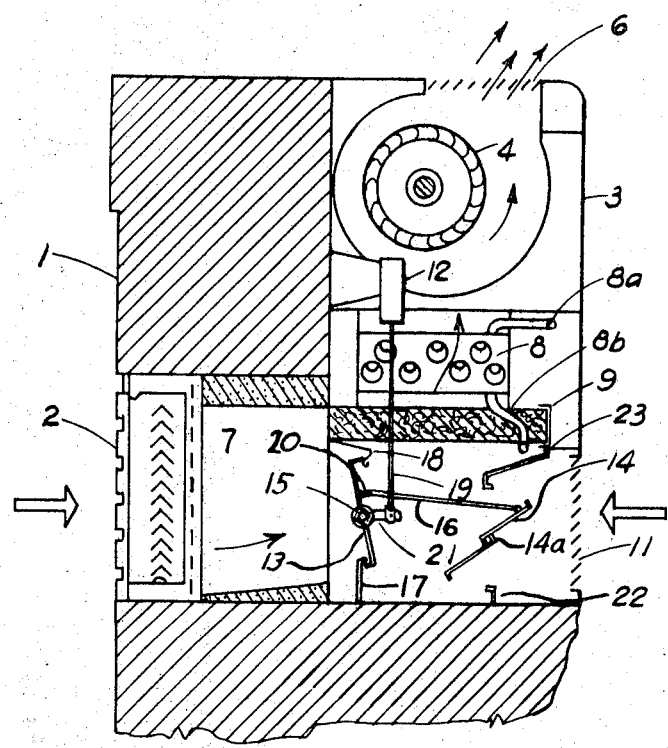
FIG. 1 is a schematic view of a unit ventilator which can include a damper arrangement in accordance with the present invention.

In one application a damper as shown in the examples of FIGS. 2 or 3 can be provided as a unit ventilator as shown in the example of FIG. 1. The unit ventilator is enclosed in a casing 3 which provides a recirculated air inlet 11 and a conditioned air outlet 6 communicating with the space served by the unit. Casing 3 can be located next to a wall 1 of the served space and a fresh air inlet conduit 7 can extend through the wall between a fresh air inlet louver assembly 2 to communicate with a fresh air inlet to casing 3 defined between baffles 17 and 18 as shown.

A fan 4 is provided to draw fresh air into the ventilator through inlet conduit 7 and recirculated air into the conduit through inlet 11 of casing 3. The air streams are mixed, tempered as hereinafter described, and directed through conditioned air outlet 6 to the served space.

A heat exchange device 8, having a tempered fluid supply conduit 8b and a tempered fluid outlet conduit 8a is disposed across the air flow conduit defined within casing 3 so the air stream flows across the heat exchange area to be tempered before admission to fan 4. As shown, an air filter 9 can be disposed upstream of heat exchange 8 to remove particulate matter from the air stream to reduce contamination of the heat exchange surfaces.

A recirculated air damper 14, mounted on a rotatable shaft 14a, is provided to modulate the flow of air admitted through recirculated air inlet 11. Damper 14 is disposed to engage seals 22 and 23, which extend the width of the air inlet to selectively restrict recirculated air flow.

Fresh air conduit 7, as hereinbefore described, communicates with a fresh air inlet defined between baffles 17 and 18. Damper 13 is disposed between baffles 17 and 18 to regulate the flow of air through the fresh air inlet and to selectively engage baffles 17 and 18 to terminate air flow, damper 13 can be positioned by a damper operator 12, connected to an arm 21 of sleeve assembly 26 as hereinbefore described, where damper operator 12 can be actuated in response to selected conditions, for example change in temperature of the served space, to selectively position damper 13 to regulate the quantity of outdoor air admitted to casing 3.

In the arrangement shown in the FIGS. dampers 13 and 14 are connected by an operator shaft 16 to advantageously operate in opposite directions, i.e., as damper 13 closes to restrict admission of outdoor air damper 14 opens to admit additional recirculated air to the unit ventilator and vice versa so total air flow through the unit remains relatively constant.

It will be noted that in the damper arrangement shown in FIG. 2 the operator shaft 16 can be connected to bracket 10 of sleeve 26 so that damper 14 is operated in direct response to movement of operator 12 and sleeve 26 and in the arrangement shown in FIG. 3 operator rod 16 can be connected to bracket 20 so that damper 14 is moved in response to movement of damper 13.

With regard to damper 13 as hereinbefore described, groove 13a is located offcenter in the damper so that a uniform force, for example a gust of wind, distributed over a segment of the width of one side of damper 13 will cause a net turning moment to urge movement of damper 13. Advantageously, damper 13 is disposed in the unit ventilator of FIG. 1 so that in the view shown in h the FIGS. the damper is urged in a clockwise, or closing direction by any increase in total force, i.e., air velocity, to which the damper is subjected. On the other hand, it will be noted that when the damper is fully open so the surfaces are not exposed to the air flow the damper is not affected by change in air velocity through the inlet.

Thus, in operation, damper 13 is positioned by movement of sleeve 26 in response to tamper operator 12 and is repositioned independently of sleeve 26 by change in air velocity, through air inlet conduit 7. It will be noted that because of the location of shaft 15 on damper 13 and the way damper 13 is mounted in the apparatus shown in the FIGS. the damper is advantageously urged toward a closed, air flow restricting, position in response to a gust of wind directed through inlet 7.

Operator shaft 16 connects tampers 13 and 14 as hereinbefore described. Damper 14 of the damper arrangement as shown in FIG. 3 moves in response to movement of damper 13 and, for example, is opened when damper 13 is closed so additional recirculated air is admitted to casing 3 so the total quantity of air flow emitted from outlet 6 remains relatively constant and a sudden in-rush of outdoor air is avoided to prevent adverse variation in temperature of the air stream emitted from outlet 6. It will be noted that when damper 13 is urged toward a closed positioning response to such increase in air velocity spring 38 is extended and upon termination of the gust of wind damper 13 is returned to the selected position to once again provide the desired rate of admission of outdoor air.

When a damper in accordance with the example of FIG. 2 is provided in the application shown in FIG. 1 the position of damper 14 is controlled by movement of sleeve 26 and operator 12 and not the position of damper 13. Thus, in operation a gust of wind entering inlet 7 will tend to close damper 13 but will not affect the position of damper 14.

We claim:

1. A damper arrangement disposed in a fluid flow conduit for controlling flow of fluid through said conduit comprising:
    fluid flow damper means;
    pivotable damper operator means actuated by change in selected condition;
    yieldable means having a preselected yield point connecting said damper operator means and said damper means so said damper is moved in response to movement of said operator means and is moved independently of said damper operator means by force beyond the yield point of said yieldable means selectively exerted on said damper.

2. The damper arrangement of claim 1 wherein said damper is connected to rotatable damper shaft along an axis of said damper where said axis is displaced from the geometric center axis of said damper so a force exerted uniformly over an area of said damper transverse to said damper shaft will result in a turning moment about said damper shaft.

3. The damper arrangement of claim 2 wherein said damper operator means includes sleeve means disposed in a freely rotatable relation on said damper shaft means and spring means connecting said damper operator means with said damper means.

4. The apparatus of claim 3 wherein said damper operator means includes arm means extending radially outwardly from said sleeve means and spring means connected from said arm means to said damper means.

5. The apparatus of claim 3 wherein said spring means include coil spring means connected to said damper operator means and to said damper means.

6. A damper control arrangement disposed in a fluid flow conduit for controlling the flow of a stream of air comprising:
    a first inlet, a second inlet, and an outlet in said conduit, said first inlet positioned adjacent outside air whereby flow of air through said first inlet is controlled by a first damper means;
    pivotable damper operator means actuated by change in selected condition;
    spring means connecting said damper operator means and said damper means so said damper is moved in response to movement of said operator means and is moved independently of said damper operator means by force selectively exerted on said damper;
    second damper means pivotably mounted in spaced relation from said first damper means and controls the flow of air through said second inlet; and
    connecting rod means connecting said first damper means with said damper means so said second damper means is moved in response to movement of said first damper means.

7. The apparatus of claim 6 wherein said connecting rod means is connected directly to said first damper.

8. The apparatus of claim 6 wherein said connecting rod means is connected to said damper operator means so said second damper is moved in response to movement of said damper operator means and said first damper can be moved independently of said second damper by force selectively exerted on said first damper.